(12) United States Patent
Panikkar et al.

(10) Patent No.: US 12,289,380 B2
(45) Date of Patent: Apr. 29, 2025

(54) GENERATION AND DEPLOYMENT OF CUSTOM MICROSERVICES FOR ORCHESTRATION OF MULTIPLE SOURCE SERVICES

(71) Applicant: Dell Products L.P., Round Rock, TX (US)

(72) Inventors: Shibi Panikkar, Bangalore (IN); Rohit Gosain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/974,650

(22) Filed: Oct. 27, 2022

(65) Prior Publication Data

US 2024/0146816 A1    May 2, 2024

(51) Int. Cl.
*H04L 67/51*    (2022.01)
*H04L 67/60*    (2022.01)

(52) U.S. Cl.
CPC .............. *H04L 67/51* (2022.05); *H04L 67/60* (2022.05)

(58) Field of Classification Search
CPC ................................ H04L 67/51; H04L 67/60
See application file for complete search history.

(56) References Cited

U.S. PATENT DOCUMENTS

| | | | | |
|---|---|---|---|---|
| 2010/0077080 A1* | 3/2010 | Ku | ........................ | G06F 16/958 235/375 |
| 2016/0127254 A1* | 5/2016 | Kumar | .................... | H04L 41/00 709/226 |
| 2018/0295194 A1* | 10/2018 | Deraz | ..................... | H04L 67/51 |
| 2019/0102157 A1* | 4/2019 | Caldato | .................... | G06F 9/547 |
| 2019/0155597 A1* | 5/2019 | Lander | ................ | G06F 11/3688 |
| 2019/0312794 A1* | 10/2019 | Bruun | ..................... | H04L 41/40 |
| 2019/0320038 A1* | 10/2019 | Walsh | ................... | H04L 67/567 |
| 2019/0373074 A1* | 12/2019 | Bisti | ....................... | H04L 67/51 |
| 2020/0226140 A1* | 7/2020 | Tamjidi | ............ | G06F 16/24566 |

(Continued)

OTHER PUBLICATIONS

M. Geers et al., "Micro Frontends," https://micro-frontends.org/, Accessed Oct. 26, 2022, 9 pages.

(Continued)

*Primary Examiner* — Jason D Recek
*Assistant Examiner* — Ranjan Pant
(74) *Attorney, Agent, or Firm* — Ryan, Mason & Lewis, LLP (57) ABSTRACT

An apparatus comprises at least one processing device configured to register two or more source services, wherein registering a given source service comprises executing the given source service to identify inputs and outputs of the given source service, and to select a set of outputs from the registered source services for generating at least a portion of a user interface of an application in an application client, the selected set of outputs comprising at least first and second output from first and second ones of the registered source services. The processing device is also configured to determine an orchestration of the registered source services for obtaining the selected set of outputs, to generate a custom microservice configured to execute the registered source services in accordance with the determined orchestration, and to deploy the custom microservice in an auto-scalable computing framework accessible to the application client of the application.

20 Claims, 7 Drawing Sheets

(56) References Cited

U.S. PATENT DOCUMENTS

| | | | | |
|---|---|---|---|---|
| 2022/0224762 A1* | 7/2022 | Feng | .................. | H04L 67/1008 |
| 2022/0404813 A1* | 12/2022 | Amaro, Jr. | ............ | H04L 67/025 |
| 2023/0412694 A1* | 12/2023 | Bakos | .................. | H04L 67/562 |
| 2024/0163351 A1* | 5/2024 | Johnson | ................ | H04L 63/102 |

OTHER PUBLICATIONS

The Kubernetes Authors, "Overview of Kubernetes," https://kubernetes.io/docs/concepts/overview/#:~:text=Kubernetes%20is%20a%20portable%2C%20extensible,and%20tools%20are%20widely%20available. Accessed Oct. 26, 2022, 3 pages.

Spring, "Microservices," https://spring.io/microservices, Accessed Jan. 14, 2021, 4 pages.

S. Sugob, "The Twelve-Factor App—A Successful Microservices Guideline," https://medium.com/hiredevops-org/the-twelve-factor-app-a-successful-microservices-guideline-497f45aac506, Feb. 28, 2019, 7 pages.

Joint Development Foundation Projects, LLC., "GraphQL," https://spec.graphql.org/Oct. 2021/, Oct. 2021 Edition, 144 pages.

* cited by examiner

GENERATION AND DEPLOYMENT OF CUSTOM MICROSERVICES FOR ORCHESTRATION OF MULTIPLE SOURCE SERVICES

FIELD

The field relates generally to information processing, and more particularly to managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for generation and deployment of custom microservices for orchestration of multiple source services.

In one embodiment, an apparatus comprises at least one processing device comprising a processor coupled to a memory. The at least one processing device is configured to perform the steps of registering two or more source services, wherein registering a given one of the two or more source services comprises executing the given source service to identify one or more inputs of the given source service and one or more outputs of the given source service, and selecting a set of outputs from the registered two or more source services for generating at least a portion of a user interface of an application in an application client, the selected set of outputs comprising at least a first output from a first one of the registered two or more source services and at least a second output from a second one of the registered two or more source services, the second registered source service being different than the first registered source service. The at least one processing device is also configured to perform the steps of determining an orchestration of the registered two or more source services for obtaining the selected set of outputs, generating a custom microservice configured to execute the registered two or more source services in accordance with the determined orchestration, and deploying the custom microservice in an auto-scalable computing framework accessible to the application client of the application.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Software architecture may be designed in various ways. In some architectures, software may provide a number of functions in the form of a single, monolithic application. A "monolithic" application refers to a single-tiered, tightly-coupled software application in which various elements of the software architecture (e.g., a user interface, database access, processing logic, etc.) are combined into a single program, usually on a single platform. In software engineering, a monolithic application describes a software application that is designed without modularity. In general, modularity of software elements in a software architecture is desirable, as modularity supports reuse of portions of application logic while also enabling efficient maintenance and development (e.g., by enabling repair and replacement of parts of an application without requiring upgrading the entire application).

Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

Graph query language (GraphQL) APIs may also be used in a software architectural design. GraphQL provides a query and manipulation language for APIs, along with a runtime for answering queries in a manner that data is not "overfetched." GraphQL enables querying of only required fields of data, as compared with REST APIs which return fixed outputs that cannot be customized.

Figure 1:
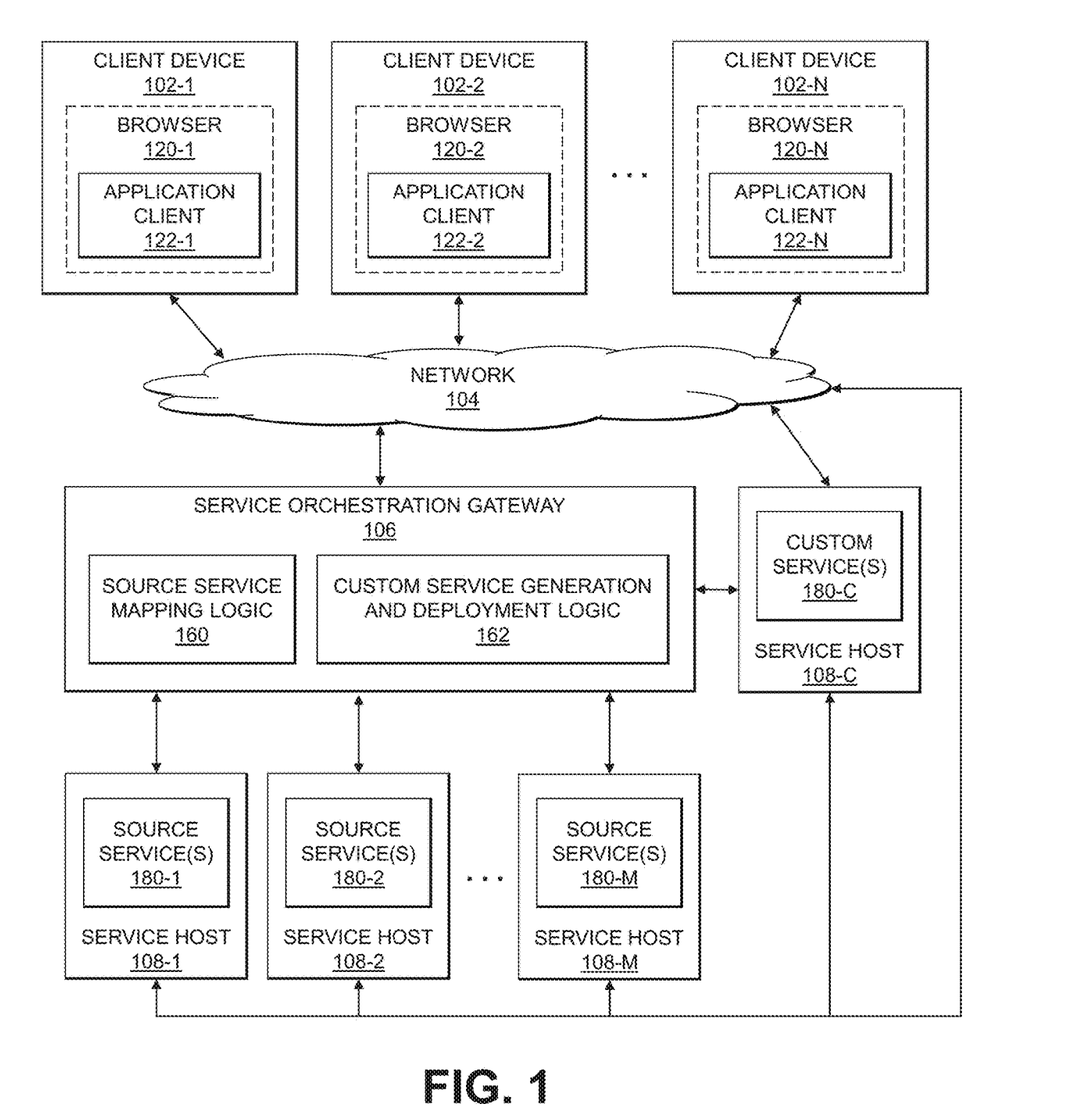
FIG. 1 is a block diagram of an information processing system configured for generation and deployment of custom microservices for orchestration of multiple source services in an illustrative embodiment.

FIG. 1 shows an information processing system 100 configured in accordance with an illustrative embodiment for generation and deployment of custom microservices for orchestration of multiple source services. The information processing system 100 comprises one or more client devices 102-1, 102-2, . . . 102-N (collectively, client devices 102) that communicate over a network 104 with a service orchestration gateway 106. Also coupled to the network 104 is a set of service hosts 108-1, 108-2, . . . 108-M and 108-C (collectively, service hosts 108). The services hosts 108-1, 108-2, . . . 108-M host respective source services 180-1, 180-2, . . . 180-M (collectively, source services 180). The source services 180 may include microservices, GraphQL APIs, etc., which are configured to provide data that is used by one or more applications running on the client devices 102. Each of the client devices 102 may implement a browser 120-1, 120-2, . . . 120-N (collectively, browsers 120) which run respective application clients 122-1, 122-2, . . . 122-N (collectively, application clients 122) that access data of the source services 180 for rendering user interfaces (UIs) of applications (e.g., web applications running in the browsers 120). In some embodiments, the application clients 122 comprise Micro Front Ends (MFEs).

The client devices 102, the service orchestration gateway 106 and the service hosts 108 illustratively comprise respective computers, servers or other types of processing devices capable of communicating with one another via the network 104. For example, at least a subset of the client devices 102, the service orchestration gateway 106, and the service hosts 108 may be implemented as respective virtual machines or software containers of a compute services platform or other type of processing platform. The client devices 102, the service orchestration gateway 106 and the service hosts 108 in such an arrangement illustratively provide compute services such as execution of one or more applications on behalf of each of one or more users associated with respective ones of the client devices 102 and the service orchestration gateway 106.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

While FIG. 1 shows an example wherein each of the client devices 102 runs a single browser instance and a single application client instance, embodiments are not limited to this arrangement. Instead, each of the client devices 102 may run multiple browser and/or application client instances.

The service orchestration gateway 106 implements source service mapping logic 160 which can be used to map an ordering and sequence of inputs and outputs from multiple ones of the source services 180 to obtain data of interest for particular applications. The service orchestration gateway 106 also implements custom service generation and deployment logic 162, which utilizes mappings created using the source service mapping logic 160 to generate custom services 180-C which are deployed on service host 108-C. The custom services 180-C can communicate with the source services 180 to obtain only the data of interest for particular applications, thus simplifying rendering of UIs by the application clients 122 of the client devices 102 (e.g., which do not need to implement their own orchestrations to fetch data from multiple different ones of the source services 180 and then combine needed portions of the fetched data to render an application UI).

At least portions of the functionality of the source service mapping logic 160 and the custom service generation and deployment logic 162 may be implemented at least in part in the form of software that is stored in memory and executed by a processor.

The client devices 102, the service orchestration gateway 106 and the service hosts 108 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The client devices 102, the service orchestration gateway 106 and the service hosts 108 (or one or more components thereof such as the browsers 120, application clients 122, source service mapping logic 160, custom service generation and deployment logic 162, source services 180 and custom services 180-C) may be implemented on respective distinct processing platforms, although numerous other arrangements are possible. For example, in some embodiments a same service host may host one or more source services and one or more of the custom services. Various other arrangements are possible.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols.

The client devices 102, the service orchestration gateway 106 and the service hosts 108 in some embodiments may be implemented as part of a cloud-based system. The client devices 102, the service orchestration gateway 106 and the service hosts 108 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 104.

The term "processing platform" as used herein is intended to be broadly construed so as to encompass, by way of illustration and without limitation, multiple sets of processing devices and one or more associated storage systems that are configured to communicate over one or more networks. For example, distributed implementations of the client devices 102 and the service hosts 108 are possible, in which certain ones of the client devices 102, the service orchestration gateway 106 and the service hosts 108 reside in one data center in a first geographic location while other ones of the client devices 102 and the service hosts 108 reside in one or more other data centers in at least a second geographic location that is potentially remote from the first geographic location. The service orchestration gateway 106 may be implemented at least in part in the first geographic location, the second geographic location, and one or more other geographic locations. Thus, it is possible in some implementations of the system 100 for different ones of the client devices 102, the service orchestration gateway 106 and the service hosts 108 to reside in different data centers.

Numerous other distributed implementations of the client devices 102, the service orchestration gateway 106 and the service hosts 108 are possible. Accordingly, the client devices 102, the service orchestration gateway 106 and the service hosts 108 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for generation and deployment of custom microservices for orchestration of multiple source services is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for generation and deployment of custom microservices for orchestration of multiple source services will now be described in more detail with reference to the flow diagram of FIG. 2. It is to be understood that this particular process is only an example, and that additional or alternative processes for generation and deployment of custom microservices for orchestration of multiple source services may be used in other embodiments.

In this embodiment, the process includes steps 200 through 208. These steps are assumed to be performed by the service orchestration gateway 106 utilizing the source service mapping logic 160 and the custom service generation and deployment logic 162. The process begins with step 200, registering two or more source services. Registering a given one of the two or more source services comprises executing the given source service to identify one or more inputs of the given source service and one or more outputs of the given source service. At least one of the registered two or more source services may comprise a source microservice. The source microservice may be deployed on a non-auto-scalable computing framework. At least one of the registered two or more source services may comprise a GraphQL API. The registered two or more source services may comprise at least one source microservice and at least one GraphQL API.

In step 202, a set of outputs from the registered two or more source services are selected for generating at least a portion of a user interface of an application in an application client. The application client may comprise a MFE. The selected set of outputs comprises at least a first output from a first one of the registered two or more source services and at least a second output from a second one of the registered two or more source services, the second registered source service being different than the first registered source service. An orchestration of the registered two or more source services for obtaining the selected set of outputs is determined in step 204.

The determined orchestration of the registered two or more source services may comprise execution of a first one of the registered two or more source services utilizing a first input to obtain at least a first output, and execution of at least a second one of the registered two or more source services, subsequent to execution of the first one of the registered two or more source services, utilizing at least the first output of the first one of the registered two or more source services. The determined orchestration of the registered two or more source services may further comprise execution of at least a third one of the registered two or more source services in parallel with the execution of the second one of the registered two or more source services. In some embodiments, the third one of the registered two or more source services utilizes at least the first output of the first one of the registered two or more source services. In other embodiments, the third one of the registered two or more source services utilizes at least a second output of the first one of the registered two or more source services, the second output of the first one of the registered two or more source services being different than the first output of the first one of the registered two or more source services.

In step 206, a custom microservice configured to execute the registered two or more source services in accordance with the determined orchestration is generated. The custom microservice is deployed in an auto-scalable computing framework accessible to the application client of the application in step 208. Step 208 may comprise deploying the custom microservice in a software container cluster, such as in a software container pod of the software container cluster. Step 208 may comprise providing, to the application client, an API endpoint uniform resource locator (URL) which, when called, provides a merged output comprising the selected set of outputs.

Figure 2:
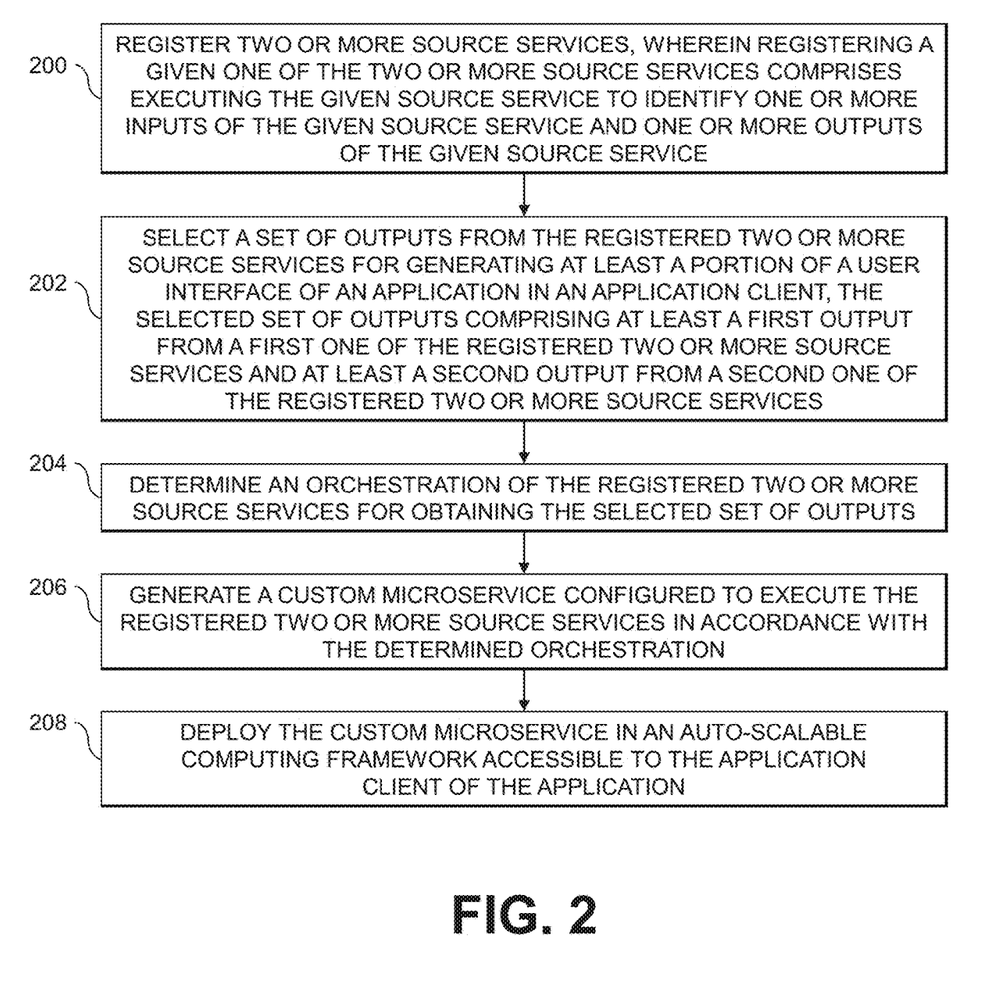
FIG. 2 is a flow diagram of an exemplary process for generation and deployment of custom microservices for orchestration of multiple source services in an illustrative embodiment.

In some embodiments, the FIG. 2 process further includes periodically testing the registered two or more source services to identify one or more changes in the one or more inputs and the one or more outputs of the registered two or more source services and, responsive to the identified one or more changes affecting the determined orchestration of the registered two or more source services for obtaining the selected set of outputs, determining a modified orchestration of the registered two or more source services for obtaining the selected set of outputs, generating an updated custom microservice configured to execute the registered two or more source services in the determined modified orchestration, and re-deploying the updated custom microservice in the auto-scalable computing framework accessible to the application client of the application.

The FIG. 2 process may further include responsive to identifying one or more changes in the selected set of outputs, determining a modified orchestration of the registered two or more source services for obtaining the changed selected set of outputs, generating an updated custom microservice configured to execute the registered two or more source services in the determined modified orchestration, and re-deploying the updated custom microservice in the auto-scalable computing framework accessible to the application client of the application.

Various applications utilize microservices and GraphQL APIs. While microservices are an almost matured technology, GraphQL is emerging in industry because of its flexibility. Another technology which may be used to develop applications is MFE technology. MFE uses microservices and GraphQL APIs to produce an independent pluggable UI for an application. MFE and other clients can access microservices and GraphQL APIs to build the UI for an application and paint the data correctly. Current approaches, however, suffer from various technical problems.

Microservices and GraphQL APIs may be exposed in different teams, some of which may not be automatically scalable (auto-scalable). While microservices can be made auto-scalable using some software container frameworks (e.g., Kubernetes), not all microservices may be part of an auto-scalable software container framework. Such non-auto-scalable microservices can be deployed in customer servers, Docker containers, etc. A GraphQL API is not designed to be auto-scalable. After retrieving the data (e.g., wanted and unwanted) from each microservice and GraphQL API, an orchestration layer needs to be written in the MFE or client side to merge the data to make it presentable in the UI. Further, any changes in source microservices or GraphQL APIs requires the orchestration in the MFE to be re-written.

In some cases, a gateway pattern (e.g., an API gateway) may be implemented. A typical API gateway, however, allows registration of just a single microservice and gives various functionality (e.g., security, throttling, monitoring, etc.) to that microservice. Thus, a conventional gateway implementation cannot solve the above-noted technical problems. Illustrative embodiments provide technical solutions for implementing a generic, intelligent and auto-scalable gateway platform that can be configured from different microservices and GraphQL APIs to automatically generate an auto-scalable orchestrator that gives only "required" data to the client (e.g., a MFE). This gateway is configured to be intelligently aware of source service (e.g., microservice and GraphQL API) changes, and enables re-creation and re-deployment of the orchestrator to abstract source service variations from the client.

Figure 3:
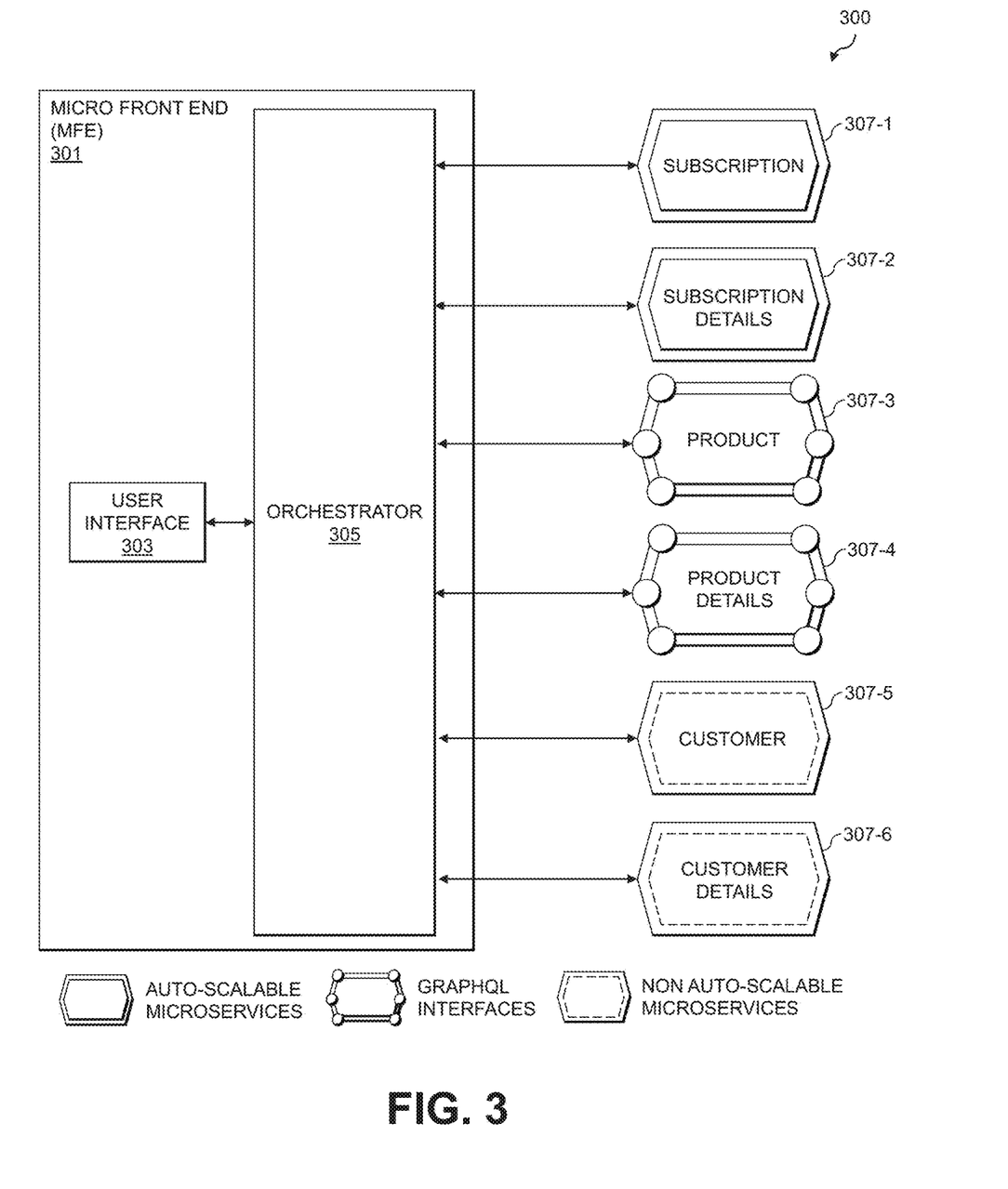
FIG. 3 shows an implementation of an orchestrator within a micro front end that generates a user interface for an application using data from multiple source services in an illustrative embodiment.

MFE, microservices and GraphQL APIs are three pillars in modern web application development for various entities, including but not limited to medium and large-scale organizations. While the combination of MFE, microservices and GraphQL APIs gives flexibility, this combination of technologies also imposes challenges. FIG. 3 shows an implementation 300 of a MFE 301 including a UI 303, an orchestrator 305 and a set of source services 307-1, 307-2, 307-3, 307-4, 307-5 and 307-6 (collectively, source services 307) of different types. Here, the source services 307-1 and 307-2 are auto-scalable microservices (e.g., in a Kubernetes platform), while the source services 307-3 and 307-4 are GraphQL APIs and the source services 307-5 and 307-6 are non-auto-scalable microservices. Here, the implementation 300 is used to show subscription and subscription details of a customer. The auto-scalable microservices include subscription microservice 307-1 and subscription details microservice 307-2, the GraphQL APIs include product API 307-3 and product details API 307-4, and the non-auto-scalable microservices include customer microservice 307-5 and customer details microservice 307-6. In the MFE 301, the orchestrator 305 (also referred to as a client orchestrator) is created to get data from the different source services 307, which is combined to show required data in the UI 303.

In the implementation 300, different types of microservices and GraphQL APIs (e.g., the different source services 307) are used to "paint" the UI 303 of the MFE 301. An orchestration layer (e.g., the orchestrator 305) needs to be created in the MFE 301 (e.g., client side) to get the data from the different source services 307 and to combine the data in the orchestration layer. Some of the source services 307, such as the GraphQL product API 307-3 and product details API 307-4 are not auto-scalable and thus may impact the MFE 301 under high load conditions. Further, the MFE 301 may only need to show a small amount of information in the UI 303. The MFE 301, however, needs to get whole and a potentially large amount of data from the source services 307, with such data being combined at the MFE 301 side. Any changes in the source services 307 can also break the orchestrator 305, which requires change and re-deployment of the orchestrator 305 in the MFE 301. Further, if any additional information is to be shown in the UI 303, the MFE 301 must make changes to the orchestrator 305.

The technical solutions described herein provide an intelligent and configurable gateway where a user can view different source services (e.g., microservices and participating GraphQL APIs). The gateway enables the user to select multiple source services (e.g., one or more microservices and/or one or more GraphQL APIs), and to graphically map the required fields (e.g., fields of interest to that user) from the selected source services for output in a MFE or other client. The gateway further generates and provides a new, auto-scalable uniform resource locator (URL) which allows clients to access and get only the required data to present in an application UI. The gateway can further monitor for and detect any changes in the source services and notifies the client or user of the same. The gateway can further cache the output from the source services for frequent access of the same data. Advantageously, any breakable changes in the source services will not break the client. Thus, the gateway provided in the technical solutions described herein can address various technical problems and drawbacks of conventional approaches through a configurable, intelligent and auto-scalable solution for abstracting changes in source services used to generate a UI of an application.

For an application which utilizes MFE, microservices and GraphQL APIs, if there is a need to show data from multiple different microservices and/or GraphQL APIs, an orchestrator must be written in the client side in order to get data from the different microservices and/or GraphQL APIs and combine such data in the client side. This is an overhead in the MFE implementation. Further, any changes in the source application will break the client orchestration and need to be re-deployed. Similarly, any changes in the UI fields will require re-deploying the client orchestrator. Different data coming from different microservices and/or GraphQL APIs may be relatively large, but the MFE may need to show only a relatively small portion of the data combined from the different microservices and/or GraphQL APIs. This will affect MFE performance.

The technical solutions described herein provide an intelligent gateway where users can register microservices and GraphQL APIs, and allow users to map microservices and GraphQL API output fields to select required fields (e.g., fields of interest) from more than one microservice and/or GraphQL API. The intelligent gateway is configured to generate a new API endpoint URL for a client to call to get the merged output from the multiple microservices and/or GraphQL APIs. This new API endpoint URL can be called by a MFE or another client. The intelligent gateway also allows users to enable a cache for the same input to the same mapped services. Any changes in the source microservices and/or GraphQL APIs will not affect the API endpoint URL that is given for the MFE or other client.

Figure 4:
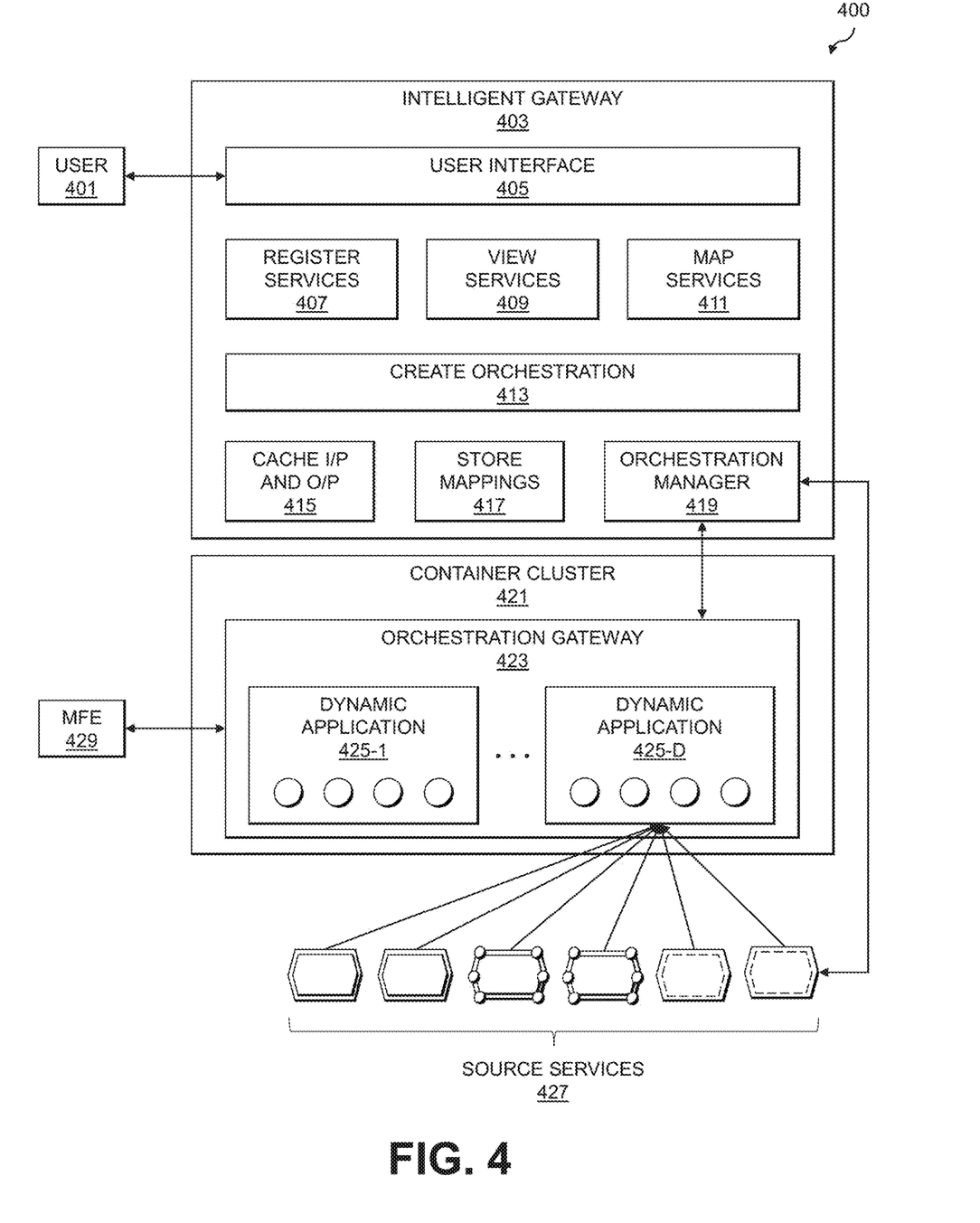
FIG. 4 shows an implementation of an intelligent gateway for generating an orchestration gateway which exposes dynamic applications that map multiple source services to a micro front end of an application in an illustrative embodiment.

FIG. 4 shows an architecture 400 including a user 401 which utilizes an intelligent gateway 403 to build an orchestration for an application. The intelligent gateway 403 includes a UI 405, which accesses functions for registering services 407, viewing services 409 and mapping services 411. Here, the services (also referred to as source services) may include microservices, GraphQL APIs, etc. The intelligent gateway 403 also provides functions for creating an orchestration 413, caching input (I/P) and (O/P) of the source services 415, and storing mappings 417. Such functions may be utilized by an orchestration manager 419 for building an orchestration for an application. This may include utilizing a container cluster 421 (e.g., a Kubernetes cluster) to deploy an orchestration gateway 423 with various dynamic applications 425-1, . . . 425-D (collectively, dynamic applications 425). The dynamic application 425 may represent custom microservices generated by the orchestration manager 419. In some embodiments, the dynamic applications 425 include auto-scalable PODs in a Kubernetes cluster. Here, the dynamic application 425-D may provide combined output from a set of source services 427 (e.g., multiple microservices and GraphQL APIs, such as the collection of source services 307 shown in FIG. 3) for an application, which is provided as an API endpoint URL to MFE 429.

The register services function 407 enables the user 401 to register the source services 427, which may include one or more microservices and/or GraphQL APIs. The intelligent gateway 403 may execute the registered source services to identify input and output fields of the registered source services. The identified input and output fields may be stored for later use. The view services function 409 allows the user 401 to view all registered source services along with their input and output fields. The map services function 411 allows the user 401 to select multiple ones of the registered source services, and to map them with one or more common fields to get a combined output. Such mappings are stored by the intelligent gateway 403 for transactional use using the store mappings function 417.

The orchestration manager 419 is configured to generate a custom microservice which is exposed as an API endpoint URL for the MFE 429 using the create orchestration function 413. The create orchestration function 413 will use stored mapping information to call different source services (e.g., microservices and/or GraphQL APIs) in parallel. Results from each of the source services are then combined to get the output mapped by the user 401 using the map services function 411. In some cases, the cache I/P and O/P function 415 is used to cache input and output fields from the same mapped source services. The orchestration manager 419 deploys the custom generated microservice as one or more of the dynamic applications 425 of the orchestration gateway 423 in the container cluster 421 (e.g., an auto-scalable deployment server). For example, the dynamic application 425-D in the orchestration gateway 423 may combine outputs from multiple source services 427 (e.g., such as the collection of source services 307 shown in FIG. 3). The dynamic application 425-D (e.g., a custom generated microservice) is exposed as an endpoint for a client to use (e.g., it is returned as an API endpoint URL to the MFE 429).

The orchestration manager 419 is further configured to abstract any changes in the registered source services 427 from the client (e.g., the MFE 429). This may be done by periodically testing each of the source services with registered input, and check if there are any breaking changes (e.g., any changes in the output relative to the output previously stored for the source services during registration). If there are changes in any of the registered source services 427, the orchestration manager 419 can re-generate code of the custom generated microservice (e.g., dynamic application 425-D) and re-deploy. If one of the stored mappings used in the custom generated microservice cannot be mapped, then the intelligent gateway 403 can alert the user 401 to manually re-map and re-deploy.

An example orchestration will now be described using the set of source services 307 shown in FIG. 3. Recall that the source services 307 include four microservices (e.g., subscription microservice 307-1, subscription details microservice 307-2, customer microservice 307-5 and customer details microservice 307-6) along with two GraphQL APIs (e.g., the product API 307-3 and the product details API 307-4). The subscription microservice 307-1 is used to obtain subscription information using an input field of "subscription ID" which returns output fields of "subscription name," "product ID," "customer ID," and "subscribed quantity." The subscription details microservice 307-2 is used to obtain subscription detail information using the input field "subscription ID" which returns output fields of "subscribed value," "contract period," and "renewal enabled." The product API 307-3 is used to get product information, and is queried with an input field "product ID" which returns output fields of "product name," "price," and "description." The product details API 307-4 is used to get product detail information, and is queried with the input field "product ID" which returns output fields of "product rating," "end of life," and "discount." The customer microservice 307-5 is used to obtain customer information using an input field of "customer ID" which returns output fields of "customer ID," "first name," "last name," and "age." The customer details microservice 307-5 is used to obtain detailed customer information using the input field "customer ID" which returns output fields of "customer ID," "bank account number," "email," "phone," "region," "city," and "language."

Assume that it is desired to create a MFE 429 that uses the input field "subscription ID" and returns output fields of "subscription ID," "subscription name," "contract period," "last name," "email," "product name," and "discount." With the set of source services 307, the subscription service 307-1 is used to give "subscription name," the subscription details microservice 307-2 is used to give "contract period," the product GraphQL API 307-3 is used to give "product name," the product details GraphQL API 307-4 is used to give "discount," the customer microservice 307-5 is used to give "last name," and the customer details microservice 307-6 is used to give "email." In a conventional MFE implementation such as the MFE 301 shown in FIG. 3, the orchestrator 305 is written inside the MFE 301 to call each of the source services 307 to get the results from each, and then combine the results to get the desired values to be shown. Such an approach is unduly complex, and would return various data that is not needed (e.g., various output fields which are not of interest to the user). Further, if there are any changes to the fields to be shown later (e.g., such as later needing to show "first name"+"last name" in the UI 303), then a code change is needed in the orchestrator 305 to include the "first name" output field from the customer microservice 307-5. Also, since in this example the product GraphQL API 307-3, the product details GraphQL API 307-4, the customer microservice 307-5 and the customer details microservice 307-6 are not auto-scalable services, the MFE 301 has a risk of erroring out in a high load state.

An example generation of a custom microservice will now be described. First, the user 401 can register all necessary source services 427 (e.g., the source services 307 shown in FIG. 3) utilizing the register services function 407. The user 401 can then view such registered services using the view services function 409, and use the map services function 411 to generate a mapping of the desired output from multiple ones of the registered source services 427.

Figure 5:
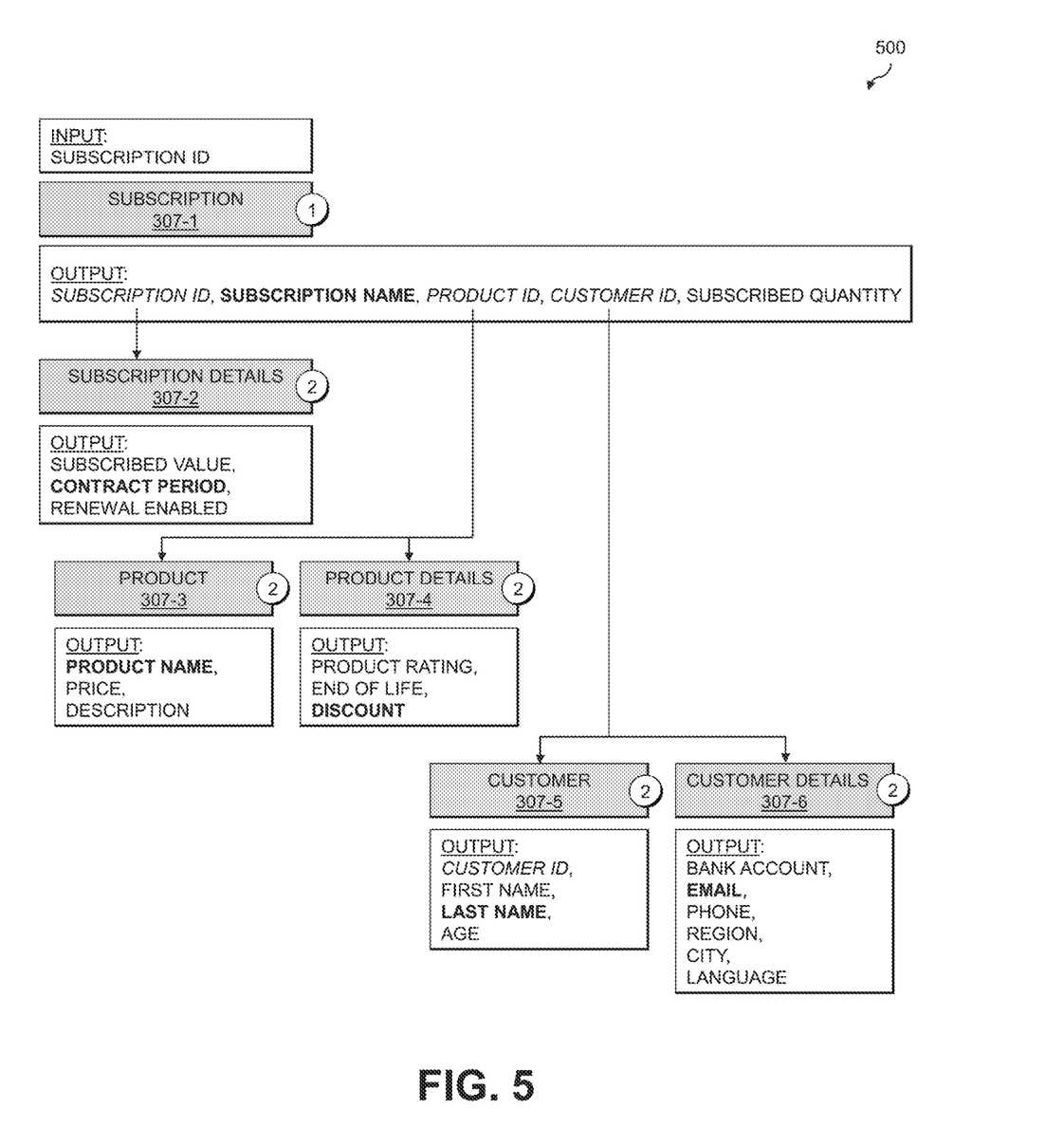
FIG. 5 shows a sequence and ordering of multiple source services in a mapping for a dynamic application of an orchestration gateway that is exposed to a micro front end of an application in an illustrative embodiment.

FIG. 5 shows an example mapping 500 of the source services 307 to generate a custom microservice for delivery to the MFE 429 utilizing the orchestration manager 419. In FIG. 5, the desired output fields are highlighted in bold, while output fields in italics are used as input for other ones of the source services. The orchestration manager 419 automatically generates code for a custom microservice which calls the source services 307 in a particular sequence specified by the mapping 500. Here, the subscription microservices 307-1 is called first, and ones of its output fields are used to call other ones of source services 307 in parallel. For example, the "subscription name" output field of the subscription microservice 307-1 is one of the desired outputs. The "subscription ID" output field of the subscription microservice 307-1 is used to call the subscription details microservice 307-2 to get the desired output field "contract period." The "product ID" output field of the subscription microservice 307-1 is used to call the product API 307-3 and the product details API 307-4 to obtain the "product name" and "discount" output fields, respectively. The "customer ID" output field of the subscription microservice 307-1 is used to call the customer microservice 307-5 and the customer details microservice 307-6 to obtain the "last name" and "email" output fields, respectively. Advantageously, the subscription details microservice 307-2, the product API 307-3, the product details API 307-4, the customer microservice 307-5 and the customer details microservice 307-6 may be called in parallel once the subscription microservice 307-1 is called to get the required inputs for such services. Thus, the subscription microservice 307-1 is labeled with a "1" while the subscription details microservice 307-2, the product API 307-3, the product details API 307-4, the customer microservice 307-5 and the customer details microservice 307-6 are labeled with a "2." It should be appreciated, however, that the sequence may include more than two steps or stages. For example, a first set of source services may be called in a first step to get output fields needed as input for a second set of source services, where output fields from one or more of the second set of source services may be used as input for a third set of source services, and so on.

The custom microservice generated based on the mapping 500 of FIG. 5 is then deployed by the orchestration manager 419 in the orchestration gateway 423 of the container cluster 421 as the dynamic application 425-D, which pulls the necessary data from source services 427 as shown. The orchestration manager 419 may periodically check the health of the source services 427 to determine whether the mappings need to be updated and re-deployed. The custom generated microservice thus has an input of "subscription ID" and outputs of "subscription ID," "subscription name," "contract period," "last name," "email," "product name," and "discount." The MFE 429 can use the custom generated microservice (e.g., the dynamic application 425-D). If it is desired to modify the information output at the MFE 429, such as to show the customer's "first name"+"last name" instead of just "last name," then the user 401 can access the map services function 411 of the UI 405 of the intelligent gateway 403 to update the mapping. The orchestration manager 419 may then re-generate the custom microservice with new code which is redeployed in the orchestration gateway 423 of the container cluster 421 as the dynamic application 425-D. The MFE 429 accessing the dynamic application 425-D will thus get the new field "first name."

The technical solutions described herein provide configurable mapping functionality for combining multiple source services (e.g., one or more microservices and/or GraphQL APIs), and for auto-generation of custom microservices through gateway orchestration that utilizes such multiple source services in an ordered sequence, and in parallel where applicable, as defined via the mappings. The technical solutions described herein further provide for automatic detection of changes in the source services to re-build a gateway orchestration for the custom microservice such that changes in the source services will not break the client.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generation and deployment of custom microservices for orchestration of multiple source services will now be described in greater detail with reference to FIGS. 6 and 7. Although described in the context of system 100, these platforms may also be used to implement at least portions of other information processing systems in other embodiments.

Figure 6:
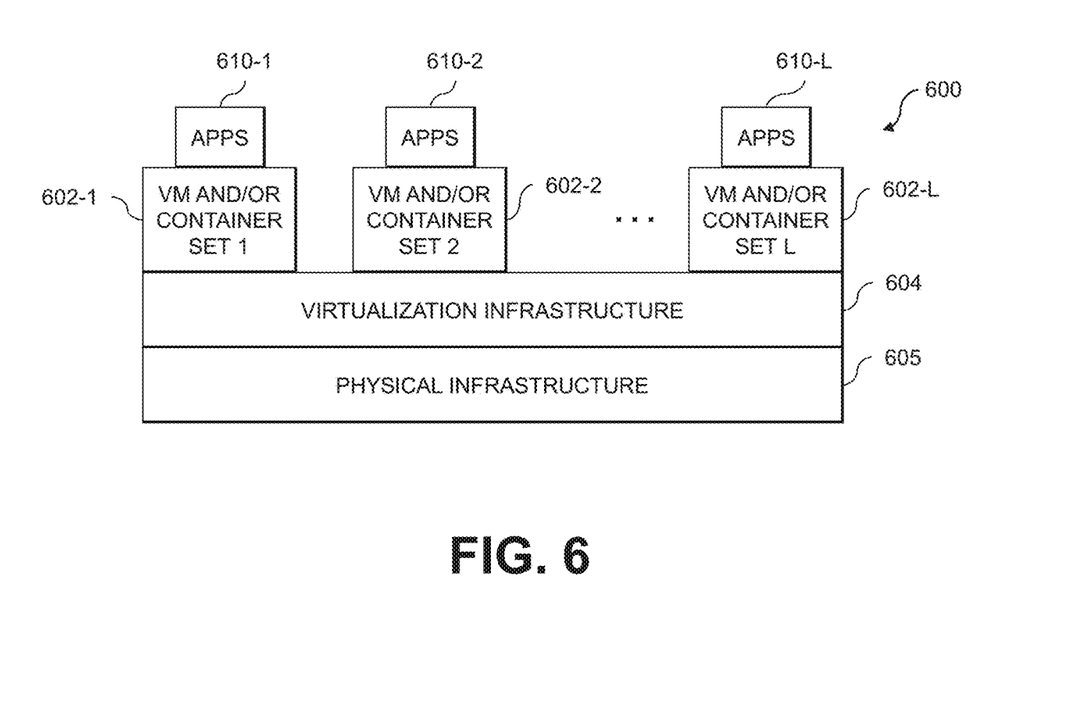
FIGS. 6 and 7 show examples of processing platforms that may be utilized to implement at least a portion of an information processing system in illustrative embodiments.
Figure 7:
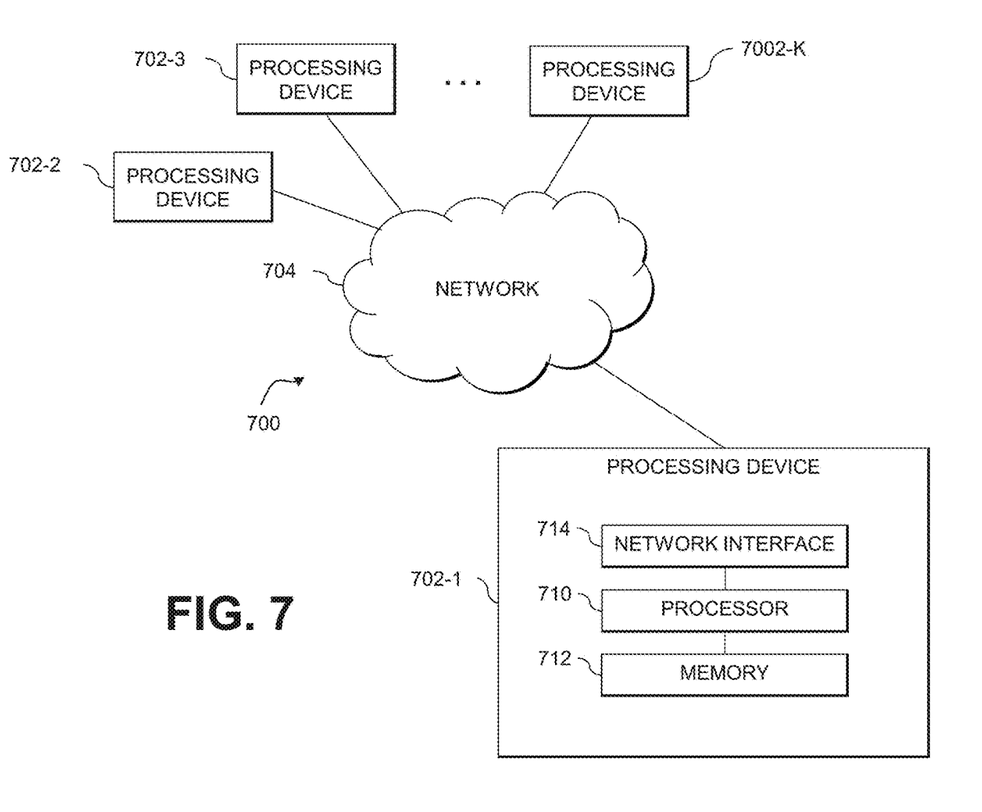

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generation and deployment of custom microservices for orchestration of multiple source services as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container environments, microservices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      registering two or more source services, wherein registering a given one of the two or more source services comprises executing the given source service to identify one or more inputs of the given source service and one or more outputs of the given source service;
      selecting a set of outputs from the registered two or more source services for generating at least a portion of a user interface of an application in an application client, the selected set of outputs comprising at least a first output from a first one of the registered two or more source services and at least a second output from a second one of the registered two or more source services, the second registered source service being different than the first registered source service;
      determining an orchestration of the registered two or more source services for obtaining the selected set of outputs, the determined orchestration specifying a first sequence of calls to respective ones of the two or more source services that returns the selected set of outputs;
      generating a custom microservice configured to execute the registered two or more source services according to the determined orchestration; and
      deploying the custom microservice in an auto-scalable computing framework accessible to the application client of the application;
   wherein deploying the custom microservice in the auto-scalable computing framework accessible to the application client of the application comprises:
      generating an application programming interface endpoint uniform resource locator which, when called, provides a merged output comprising the selected set of outputs;
      providing, to the application client, the generated application programming interface endpoint uniform resource locator;
      detecting one or more changes in the one or more inputs and the one or more outputs of at least one source service in the registered two or more source services;
      generating a modified orchestration of the registered two or more source services resulting from the detected one or more changes in the one or more inputs and the one or more outputs of the at least one source service in the registered two or more source services, the modified orchestration comprising a second sequence of calls to respective ones of the two or more source services that returns the selected set of outputs, the second sequence being different than the first sequence;
      updating the custom microservice utilizing the generated modified orchestration; and
      deploying the updated custom microservice in the auto-scalable computing framework accessible to the application client of the application, wherein deploying the updated custom microservice comprises maintaining the generated application programming interface endpoint uniform resource locator for the updated custom microservice.

2. The apparatus of claim 1 wherein at least one of the registered two or more source services comprises a source microservice.

3. The apparatus of claim 2 wherein the source microservice is deployed on a non-auto-scalable computing framework.

4. The apparatus of claim 1 wherein at least one of the registered two or more source services comprises a graph query language application programming interface.

5. The apparatus of claim 1 wherein the registered two or more source services comprise:
   at least one source microservice; and
   at least one graph query language application programming interface.

6. The apparatus of claim 1 wherein the application client comprises a micro front end.

7. The apparatus of claim 1 wherein deploying the custom microservice in the auto-scalable computing framework accessible to the application client of the application comprises deploying the custom microservice in a software container cluster.

8. The apparatus of claim 7 wherein deploying the custom microservice in the auto-scalable computing framework accessible to the application client of the application comprises deploying the custom microservice in a software container pod of the software container cluster.

9. The apparatus of claim 1 wherein detecting the one or more changes in the one or more inputs and the one or more outputs of the at least one source service in the registered two or more source services comprises:
   periodically testing the registered two or more source services to identify any changes in the one or more inputs and the one or more outputs of the registered two or more source services; and
   determining whether any of the identified changes affect the determined orchestration of the registered two or more source services for obtaining the selected set of outputs.

10. The apparatus of claim 1 wherein the at least one processing device is further configured to perform the step of, responsive to identifying one or more changes in the selected set of outputs:
    determining an updated orchestration of the registered two or more source services for obtaining the changed selected set of outputs;
    updating the custom microservice utilizing the updated orchestration; and
    deploying the updated custom microservice in the auto-scalable computing framework accessible to the application client of the application.

11. The apparatus of claim 1 wherein the determined orchestration of the registered two or more source services comprises:
    execution of a first one of the registered two or more source services utilizing a first input to obtain at least a first output; and
    execution of at least a second one of the registered two or more source services, subsequent to execution of the first one of the registered two or more source services, utilizing at least the first output of the first one of the registered two or more source services.

12. The apparatus of claim 11 wherein the determined orchestration of the registered two or more source services further comprises execution of at least a third one of the registered two or more source services in parallel with the execution of the second one of the registered two or more source services, the third one of the registered two or more source services utilizing at least the first output of the first one of the registered two or more source services.

13. The apparatus of claim 11 wherein the determined orchestration of the registered two or more source services further comprises execution of at least a third one of the registered two or more source services in parallel with the execution of the second one of the registered two or more source services, the third one of the registered two or more source services utilizing at least a second output of the first one of the registered two or more source services, the second output of the first one of the registered two or more source services being different than the first output of the first one of the registered two or more source services.

14. The apparatus of claim 1 wherein the selected set of outputs comprises less than all of the outputs of at least one of the first one of the registered two or more source services and the second one of the registered two or more source services.

15. A computer program product comprising a non-transitory processor-readable storage medium having stored therein program code of one or more software programs, wherein the program code when executed by at least one processing device causes the at least one processing device to perform steps of:
registering two or more source services, wherein registering a given one of the two or more source services comprises executing the given source service to identify one or more inputs of the given source service and one or more outputs of the given source service;
selecting a set of outputs from the registered two or more source services for generating at least a portion of a user interface of an application in an application client, the selected set of outputs comprising at least a first output from a first one of the registered two or more source services and at least a second output from a second one of the registered two or more source services, the second registered source service being different than the first registered source service;
determining an orchestration of the registered two or more source services for obtaining the selected set of outputs, the determined orchestration specifying a first sequence of calls to respective ones of the two or more source services that returns the selected set of outputs;
generating a custom microservice configured to execute the registered two or more source services according to the determined orchestration; and
deploying the custom microservice in an auto-scalable computing framework accessible to the application client of the application;
wherein deploying the custom microservice in the auto-scalable computing framework accessible to the application client of the application comprises:
generating an application programming interface endpoint uniform resource locator which, when called, provides a merged output comprising the selected set of outputs;
providing, to the application client, the generated application programming interface endpoint uniform resource locator;
detecting one or more changes in the one or more inputs and the one or more outputs of at least one source service in the registered two or more source services;
generating a modified orchestration of the registered two or more source services resulting from the detected one or more changes in the one or more inputs and the one or more outputs of the at least one source service in the registered two or more source services, the modified orchestration comprising a second sequence of calls to respective ones of the two or more source services that returns the selected set of outputs, the second sequence being different than the first sequence;
updating the custom microservice utilizing the generated modified orchestration; and
deploying the updated custom microservice in the auto-scalable computing framework accessible to the application client of the application, wherein deploying the updated custom microservice comprises maintaining the generated application programming interface endpoint uniform resource locator for the updated custom microservice.

16. The computer program product of claim 15 wherein detecting the one or more changes in the one or more inputs and the one or more outputs of the at least one source service in the registered two or more source services comprises:
periodically testing the registered two or more source services to identify any changes in the one or more inputs and the one or more outputs of the registered two or more source services; and
determining whether any of the identified changes affect the determined orchestration of the registered two or more source services for obtaining the selected set of outputs.

17. The computer program product of claim 15 wherein the program code when executed by the at least one processing device further causes the at least one processing device, responsive to identifying one or more changes in the selected set of outputs, to perform the steps of:
determining an updated orchestration of the registered two or more source services for obtaining the changed selected set of outputs;
updating the custom microservice utilizing the updated orchestration; and
deploying the updated custom microservice in the auto-scalable computing framework accessible to the application client of the application.

18. A method comprising:
registering two or more source services, wherein registering a given one of the two or more source services comprises executing the given source service to identify one or more inputs of the given source service and one or more outputs of the given source service;
selecting a set of outputs from the registered two or more source services for generating at least a portion of a user interface of an application in an application client, the selected set of outputs comprising at least a first output from a first one of the registered two or more source services and at least a second output from a second one of the registered two or more source services, the second registered source service being different than the first registered source service;
determining an orchestration of the registered two or more source services for obtaining the selected set of outputs, the determined orchestration specifying a first sequence of calls to respective ones of the two or more source services that returns the selected set of outputs;

generating a custom microservice configured to execute the registered two or more source services according to the determined orchestration; and deploying the custom microservice in an auto-scalable computing framework accessible to the application client of the application;

wherein deploying the custom microservice in the auto-scalable computing framework accessible to the application client of the application comprises:

generating an application programming interface endpoint uniform resource locator which, when called, provides a merged output comprising the selected set of outputs;

providing, to the application client, the generated application programming interface endpoint uniform resource locator;

detecting one or more changes in the one or more inputs and the one or more outputs of at least one source service in the registered two or more source services;

generating a modified orchestration of the registered two or more source services resulting from the detected one or more changes in the one or more inputs and the one or more outputs of the at least one source service in the registered two or more source services, the modified orchestration comprising a second sequence of calls to respective ones of the two or more source services that returns the selected set of outputs, the second sequence being different than the first sequence;

updating the custom microservice utilizing the generated modified orchestration; and deploying the updated custom microservice in the auto-scalable computing framework accessible to the application client of the application, wherein deploying the updated custom microservice comprises maintaining the generated application programming interface endpoint uniform resource locator for the updated custom microservice;

wherein the method is performed by at least one processing device comprising a processor coupled to a memory.

19. The method of claim 18 wherein detecting the one or more changes in the one or more inputs and the one or more outputs of the at least one source service in the registered two or more source services comprises:

periodically testing the registered two or more source services to identify any changes in the one or more inputs and the one or more outputs of the registered two or more source services; and determining whether any of the identified changes affect the determined orchestration of the registered two or more source services for obtaining the selected set of outputs.

20. The method of claim 18 further comprising, responsive to identifying one or more changes in the selected set of outputs:

determining an updated orchestration of the registered two or more source services for obtaining the changed selected set of outputs;

updating the custom microservice utilizing the updated orchestration; and deploying the updated custom microservice in the auto-scalable computing framework accessible to the application client of the application.

* * * * *